No. 812,201. PATENTED FEB. 13, 1906.
L. GIRARDOT.
METHOD OF MOUNTING AND AUTOMATICALLY ADJUSTING THE LAMPS OF MOTOR ROAD VEHICLES.
APPLICATION FILED OCT. 14, 1904.
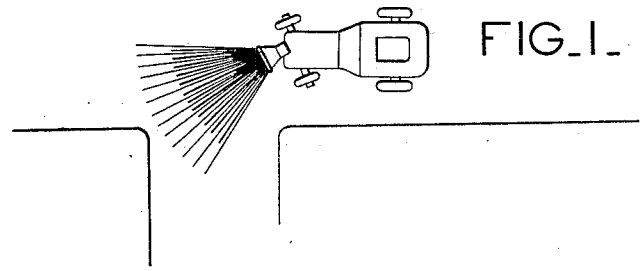
FIG. 1.
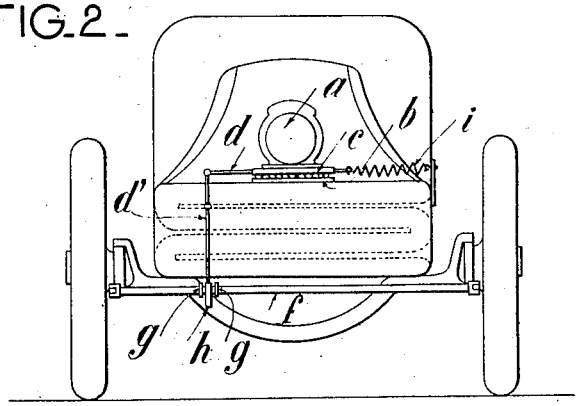
FIG. 2.
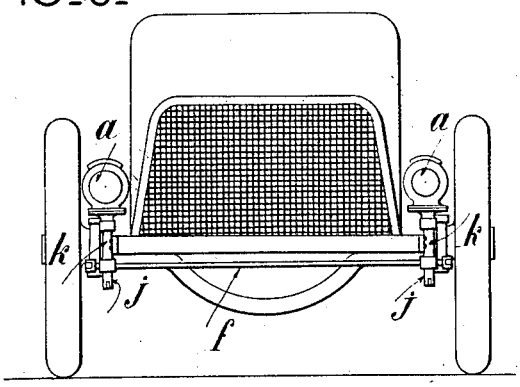
FIG. 3.
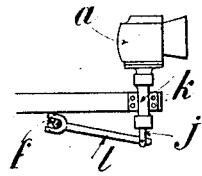
FIG. 4.
Witnesses
Inventor
Léonce Girardot

UNITED STATES PATENT OFFICE.

LÉONCE GIRARDOT, OF PUTEAUX, FRANCE.

METHOD OF MOUNTING AND AUTOMATICALLY ADJUSTING THE LAMPS OF MOTOR ROAD-VEHICLES.

No. 812,201.      Specification of Letters Patent.      Patented Feb. 13, 1906.

Application filed October 14, 1904. Serial No. 228,474.

*To all whom it may concern:*

Be it known that I, LÉONCE GIRARDOT, a citizen of the French Republic, residing at 7 Rue Ampère, Puteaux, Seine, in the Republic of France, have invented new and useful Improvements in Methods of Mounting and Automatically Adjusting the Lamps of Motor Road-Vehicles, of which the following is a specification.

This invention relates to a new or improved method of mounting and automatically adjusting the lamps of motor road-vehicles.

It has hitherto been usual to fix the lamp or lamps of a motor road-vehicle to the frame of the latter, so that while the vehicle is passing round a corner or traveling through a curve the beam or beams of light continue to be projected in the direction of the axis of the car and do not illuminate the sides of the curved path along which the steering-wheels are guiding the vehicle. This fact causes great difficulty in negotiating turnings during darkness and may result in serious accidents.

The present invention consists in arranging the lamp or lamps on their supports in such a manner that they are movable and in connecting them to the steering-rod placed between the two front wheels, so that when the direction of the said wheels is changed the lamps move pivotally about their own axes and project their rays in the new direction assumed by the steering-wheels. By this means the track is illuminated while the car is traveling through curves, and the arrangement also allows of projecting the light of the lamps onto sign-posts or the like at the sides of straight roads by turning the front wheels of the car without turning the latter.

In the annexed drawings, Figure 1 is a diagrammatic view illustrating the effect of the arrangement when the car is about to travel round a corner. Fig. 2 illustrates the arrangement as applied to a single lamp placed in front of a motor-car and in the central longitudinal axis of the latter. Fig. 3 illustrates the arrangement in connection with lamps placed in front of the car at the sides of the radiator; and Fig. 4 is a side view of a lamp connected with a rod, by means of which it can be rotated.

In the arrangement shown in Fig. 2 the lamp $a$ can, for instance, be mounted on a ball-bearing supported by a plate $b$, fixed to the cooling-jacket or the frame. The foot $c$ of the lamp is connected, by means of rods $d$ $d'$, with the steering-rod $f$, the latter being provided with two collars $g$, between which a fork $h$ at the lower end of the vertical rod $d'$ engages. When the direction of traveling is changed, the steering-rod $f$ is laterally displaced and acts by means or one of the collars $g$ on the fork $h$, so that the lamp is rotated by means of the rods $d$ $d'$ in the same direction as the steering-wheels. A spring $i$, connected at one end to the lamp and at the other end to a fixed part of the frame, prevents the lamp from oscillating under the effect of the vibration of the car.

In the arrangement illustrated in Figs. 3 and 4 each lamp $a$ is provided with a tubular downward projection $j$, inserted into a sleeve $k$, fixed to the frame, so that the lamp can rotate in the said sleeve with the aid of a ball-bearing similarly to the steering-rod of a cycle in the frame-head. The lower end of each projection $j$ is connected, by means of a short rod $l$, with the steering-rod $f$ of the car. The bifurcated end of the rod $l$ engages the rod $f$ between two collars, so that the lateral displacement of the said rods $f$ for the purpose of changing the direction of the car causes one of the collars to act on the rod $l$ and to operate the latter in such a manner that the downward projection of the lamp is caused to rotate in its support.

It will be understood that the forms of construction described are only given by way of example and that many other forms can be used without altering the principle of the invention.

Having now described my invention, what I claim as new, and desire to secure by Letters Patent, is—

A device for automatically adjusting the lamps of motor-cars in accordance with changes in the direction of traveling comprising in combination a rotary lamp-support $c$ pivotally mounted on a ball-bearing, a plate $b$ supporting said ball-bearing and rigidly fixed to the cooling-jacket or the frame of the motor-car, a horizontal rod $d$ attached by one end to the rotatory lamp-support $c$, a vertical rod $d'$ connected by one end to the free end of the horizontal rod $d$, provided at its other end with a fork $h$, and pivoted in an intermediate point to the cooling-jacket or the frame of the motor-car, two collars $g$ $g$ mounted on the steering-rod $f$ and adapted to engage with the forked end of the vertical rod $d'$, and a spring $i$ connecting one end of the lamp-support to a fixed part of the frame.

In testimony whereof I have signed my name to this specification in the presence of two subscribing witnesses.

LÉONCE GIRARDOT.

Witnesses:
　ANTOINE LAVOIX,
　ARCHIBALD R. BAKER.